United States Patent [19]

Collier, III

[11] 3,858,970

[45] Jan. 7, 1975

[54] CONTINUOUS SHOW SLIDE PROJECTOR

[75] Inventor: John Daniel Collier, III, Dunwoody, Ga.

[73] Assignee: Bell & Howell Company, Chicago, Ill.

[22] Filed: Dec. 21, 1973

[21] Appl. No.: 427,192

Related U.S. Application Data

[63] Continuation of Ser. No. 179,776, Sept. 13, 1971, abandoned.

[52] U.S. Cl. .................. 353/21, 353/113, 353/117
[51] Int. Cl. ..................... G03b 23/02, G03b 23/06
[58] Field of Search ............. 353/21, 116, 117, 107

[56] References Cited
UNITED STATES PATENTS

| 3,143,036 | 8/1964 | Rohmann | 353/116 |
| 3,606,528 | 9/1971 | Costanza | 353/21 |
| 3,659,934 | 5/1972 | Costanza et al. | 353/21 |

*Primary Examiner*—Richard E. Aegerter
*Assistant Examiner*—A. J. Mirabito
*Attorney, Agent, or Firm*—John E. Peele, Jr.

[57] ABSTRACT

A slide projector having a supply station and a previewing station including means for receiving a supply of slides may be operated to present a continuous slide show.

1 Claim, 5 Drawing Figures

PATENTED JAN 7 1975

CONTINUOUS SHOW SLIDE PROJECTOR

This is a continuation of Ser. No. 179,776, filed Sept. 13, 1971, now abandoned.

BACKGROUND OF THE INVENTION

This invention relates to slide projectors including a previewing station that may be operated to present a continuous slide show.

Slide projectors have been developed that include a previewing station. At the previewing station an operator may view a slide before it is projected. The preliminary viewing allows the operator to prepare his commentary prior to the slide's projection. In some previewing stations the operator has access to the slide and may edit the presentation by reorienting, removing, or adding a slide to the presentation. In general, slides are cycled from a supply station to the previewing station and then to a projection station. From the projection station the slides may be returned to the original container or to an intermediate holding chamber from which they may be placed in an appropriate supply container.

This class of projectors does not have the capacity to present a continuous show. After a first supply of slides has been presented there will be no slide present in the previewing station. Consequently, the projector must be cycled at least twice before a slide appears on the screen. This discontinuity not only interrupts the presentation but also projects the full intensity of the projection bulb on the screen until a slide from the new supply reaches the projection station.

SUMMARY OF THE INVENTION

This invention responds to those difficulties by presenting a slide projector which may be used to preview slides and alternately which may be used to present a continuous show. To accomplish that objective the previewing station is modified to accept a supply container. Thus, the projector has a conventional supply station and a previewing-supply station.

The projector may be used alternately to present a discontinuous show in which the previewing capabilities are utilized and to present a continuous show when the previewing capabilities are not utilized.

BRIEF DESCRIPTION OF THE DRAWINGS

The principles of this invention will be further explained in conjunction with the following figures in which.

DETAILED DESCRIPTION OF A PREFERRED EMBODIMENT

Figure 1:
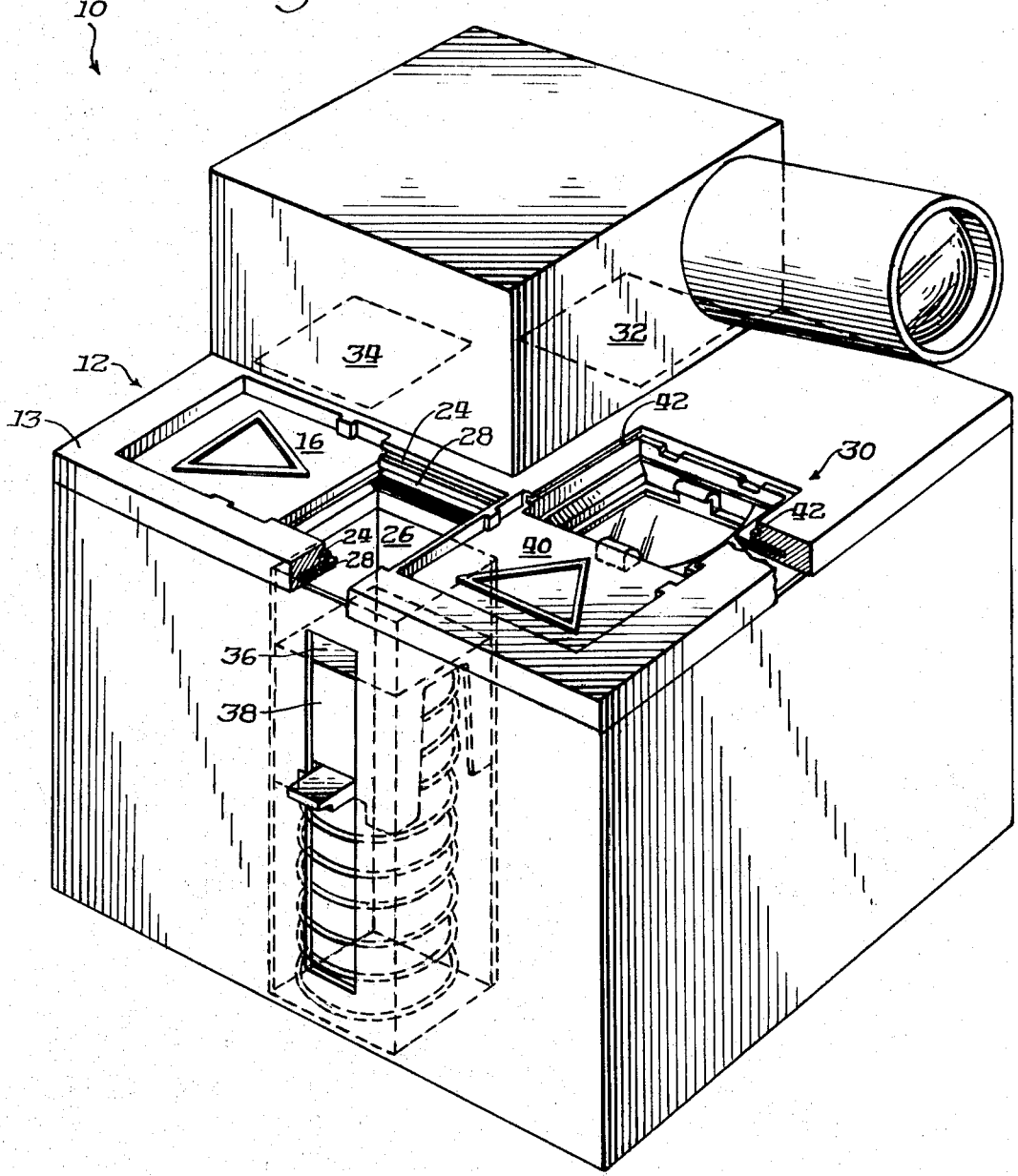
FIG. 1 is a partially schematic perspective view of a slide projector incorporating the principles of this invention.

FIG. 1 illustrates a slide projector 10 that has the dual capability of previewing and presenting a continuous show. Many of the projector's details are not necessary to an understanding of this invention and therefore have been omitted. Those details are set forth in U.S. Pat. No. 3,659,934.

Figure 2:
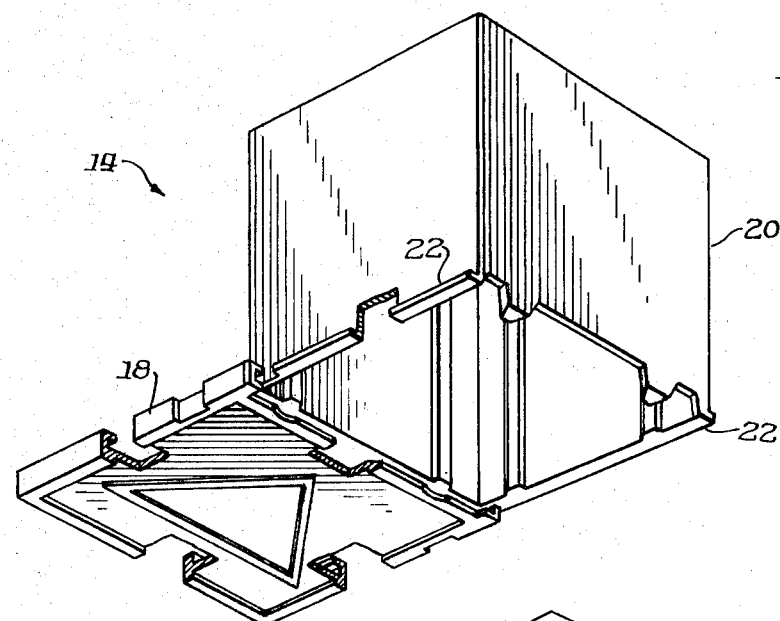
FIG. 2 is a perspective view of a slide magazine for use in the projector of FIG. 1.

The projector 10 includes a supply station 12 formed in a housing 13 which may receive a supply magazine 14 depicted in FIG. 2. A well 16 is formed in the supply station 12 to receive the correspondingly shaped cover 18 of the magazine 14.

A supply of slides is inserted into the projector by placing the cover 18 in the well 16 and sliding the slide containing chamber 20 rightwardly. The flanges 22 on the chamber 20 cooperate with the grooves 24 to locate the supply over the supply aperture 26. A pair of retaining arms 28 support the stack of horizontally oriented slides.

A transport mechanism described in the aforementioned application then cycles slides from the stack one at a time through four stations. A slide is cycled first to the previewing station 30 formed in the housing 13. At the previewing station 30 the operator may view the slide and edit it if necessary. The previewed slide is then cycled to a projection station 32 and a post-projection station 34. From the post-projection station 34 the slide passes under the retaining arms 28 and drops into a collection chamber 36.

After all the slides in a given supply are deposited in the collection chamber 36, a loading platform 38 may be raised to return the slides to the slide chamber 20. Sliding the slide chamber 20 leftwardly permits removal of the magazine 14 and the projector is ready to accept a second supply of slides.

It is readily apparent that after the second supply is placed in the supply station 16 the projector must be cycled twice before the bottommost slide arrives at the projection station. In many situations this discontinuity is disconcerting to the operator and audience.

THE CONTINUOUS SHOW

To eliminate those discontinuities when they are undesirable and thereby present a continuous show the previewing station 30 includes a well 40 and grooves 42 for receiving a magazine 14 in the same manner as the supply station 12. The previewing station 30 is actually a previewing-supply station. Its function depends on the will of the operator.

Figure 3A:
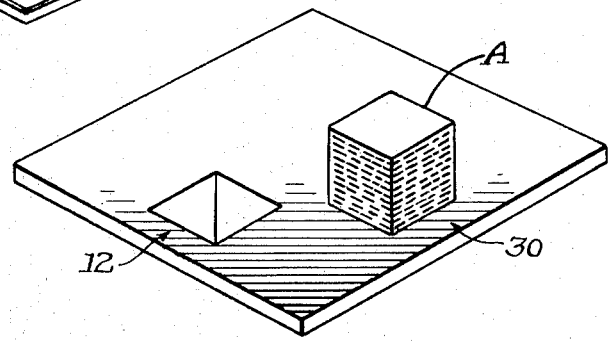
FIGS. 3(A–C) are a schematic representation of a method of practicing this invention.
Figure 3B:
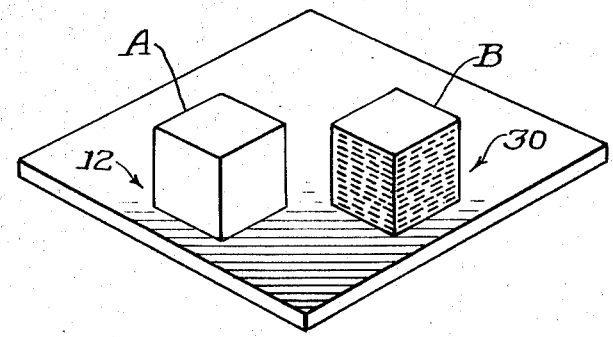
Figure 3C:
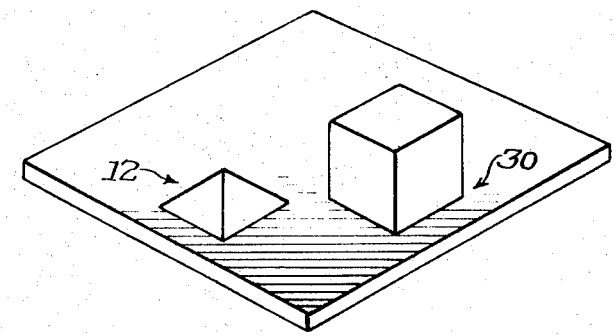

The method of presenting a continuous show is best described in conjunction with FIGS. 3(A–C).

The continuous show is begun in FIG. 3A by inserting a full magazine A in the previewing-supply station 30. The slides in magazine A are cycled through the projector until the last slide in magazine A is at the projection station.

For reasons of clarity the details of the cartridges and stations have been omitted from FIGS. 3(A–C). Of course, they are the same as have been fully illustrated in FIGS. 1 and 2.

Magazine A is then removed from the previewing-supply station 30 and inserted in the supply station 12 as shown in FIG. 3B. A second full magazine B is placed in the previewing-supply station 12. The projector is then cycled twice to deposit the last slides belonging to magazine A in the collection chamber.

The collection chamber 36 then contains all the slides that belong in magazine A. The loading platform 38 is raised to return the slides to magazine A and it is then removed from the projector. As seen in FIG. 3B magazine B remains at the previewing-supply station until its slides are exhausted. Thereafter as many subsequent magazines as desired may be cycled through the projector in a continuous show by repeating the procedure outlined for magazines A and B with B and C etc.

What is claimed is:

1. Improvements in a slide projector including a housing and a slide transport means for accepting slides and transporting same to a projection station in said housing, the housing having a supply station at which slides may be introduced into and removed from said transport means, the transport means being arranged to transport a slide from said supply station to said previewing station, and to transport a slide from said previewing station to said projection station and out of said projection station toward said supply station, the improvement comprising:

magazine coupling means at said supply station for receiving a magazine adapted to contain a first plurality of slides to be fed by said transport means to said previewing station and said projection station; and magazine coupling means at said previewing station for receiving a magazine adapted to contain a second plurality of slides to be fed by said transport means to said projection station other than when slides are transported from said supply station to enable transporting continuously to said projection station slides alternatively introduced serially at said supply station and at said previewing station.

* * * * *